(12) United States Patent
Lepelmeier

(10) Patent No.: US 11,318,727 B2
(45) Date of Patent: May 3, 2022

(54) METHOD AND AGENT FOR FIXING PARTICLES ON A SUBSTRATE

(71) Applicant: JOMESA Meßsysteme GmbH, Ismaning (DE)

(72) Inventor: Jörn Lepelmeier, Ismaning (DE)

(73) Assignee: JOMESA MESSYSTEME GMBH, Ismaning (DE)

( * ) Notice: Subject to any disclaimer, the term of this patent is extended or adjusted under 35 U.S.C. 154(b) by 109 days.

(21) Appl. No.: 16/562,699

(22) Filed: Sep. 6, 2019

(65) Prior Publication Data
US 2020/0079067 A1    Mar. 12, 2020

(30) Foreign Application Priority Data
Sep. 8, 2018    (DE) ...................... 10 2018 121 948.2

(51) Int. Cl.
*B29C 65/52* (2006.01)
*B32B 27/14* (2006.01)
(Continued)

(52) U.S. Cl.
CPC .............. *B32B 37/12* (2013.01); *B01D 71/48* (2013.01); *B29C 65/483* (2013.01); *B29C 65/52* (2013.01); *B29C 65/548* (2013.01); *B32B 5/028* (2013.01); *B32B 5/16* (2013.01); *B32B 27/14* (2013.01); *B32B 27/36* (2013.01); *B32B 37/24* (2013.01);
(Continued)

(58) Field of Classification Search
CPC ....... B01D 71/48; B29C 65/483; B29C 65/52; B29C 65/523; B29C 65/526; B29C 65/54; B29C 65/548; B32B 5/028; B32B 5/16; B32B 5/24; B32B 5/30; B32B 7/12; B32B 27/14; B32B 27/36; B32B 37/12; B32B 37/1284; B32B 37/24; B32B 2037/1253; B32B 38/0012; B32B 2038/0028; B32B 2038/168; B32B 2262/0284; G01N 1/28; G01N 1/36; G01N 2001/2833;
(Continued)

(56) References Cited

U.S. PATENT DOCUMENTS

| | | |
|---|---|---|
| 3,087,850 A | 4/1963 | Cole |
| 3,523,846 A | 8/1970 | Muller |

(Continued)

FOREIGN PATENT DOCUMENTS

| | | |
|---|---|---|
| DE | 1569901 C2 | 9/1975 |
| DE | 2633329 A1 | 2/1977 |

(Continued)

OTHER PUBLICATIONS

Examination Report dated Dec. 10, 2019 in DE Application No. DE 102018121948.2.

*Primary Examiner* — Michael A Tolin
(74) *Attorney, Agent, or Firm* — Panitch Schwarze Belisario & Nadel LLP

(57) ABSTRACT

Provided is a method for fixing particles on a two-dimensional filter medium with open pores. The particles are to be fixed on the upper side of the filter medium. The method involves contacting the particles with an adhesive solution from the lower side of the filter medium through the pores. The method makes it possible to fix particles in a simple and inexpensive manner to the filter medium, such that subsequent microscopic or SEM/EDX investigation is impaired as little as possible.

9 Claims, 1 Drawing Sheet

(51) Int. Cl.
- *B32B 37/12* (2006.01)
- *B32B 37/24* (2006.01)
- *B32B 5/16* (2006.01)
- *G01N 1/28* (2006.01)
- *B01D 71/48* (2006.01)
- *B32B 27/36* (2006.01)
- *B32B 38/00* (2006.01)
- *B32B 5/02* (2006.01)
- *B29C 65/54* (2006.01)
- *B29C 65/48* (2006.01)

(52) U.S. Cl.
CPC .. *B32B 38/0012* (2013.01); *B32B 2038/0028* (2013.01); *B32B 2262/0284* (2013.01); *G01N 2001/2833* (2013.01)

(58) Field of Classification Search
CPC ..... G01N 2001/364; G01N 2001/4088; G01N 23/2251; G01N 23/2252
See application file for complete search history.

(56) References Cited

U.S. PATENT DOCUMENTS

| | | |
|---|---|---|
| 4,163,822 A | 8/1979 | Walter |
| 4,557,903 A | 12/1985 | McCormick |
| 5,269,671 A | 12/1993 | McCormick |
| 5,427,742 A | 6/1995 | Holland |
| 5,665,398 A | 9/1997 | McCormick |
| 7,005,110 B2 | 2/2006 | Taft et al. |
| 9,546,937 B2 | 1/2017 | Freeland et al. |
| 2008/0254504 A1 | 10/2008 | Vom et al. |

FOREIGN PATENT DOCUMENTS

| | | | |
|---|---|---|---|
| DE | 102 27 761 A1 | 1/2004 | |
| DE | 10227761 A1 * | 1/2004 | ............... G01N 1/28 |
| EP | 0255375 B1 | 11/1990 | |
| EP | 1842044 B1 | 3/2017 | |
| WO | 2009152575 A1 | 12/2009 | |
| WO | 2010007453 A2 | 1/2010 | |

* cited by examiner ent invention.

METHOD AND AGENT FOR FIXING PARTICLES ON A SUBSTRATE

CROSS-REFERENCE TO RELATED APPLICATION

This application claims priority under 35 U.S.C. § 119(b) to German Application No. 10 2018 121 948.2, filed Sep. 8, 2018, the disclosure of which is incorporated herein by reference in its entirety.

BACKGROUND OF THE INVENTION

The present invention relates to a method and an agent for fixing particles to a substrate, in particular for electron-microscopic or light-microscopic investigation of the particles.

In particular, the invention relates to a method for fixing particles on a substrate, comprising the method steps:
(a) providing a substrate which contains open pores and which has an upper side and a lower side, with the particles to be fixed on the upper side,
(b) providing an adhesive solution which contains a fixing agent and/or a precursor for a fixing agent in a solvent or diluent,
(c) contacting of particles and adhesive solution,
(d) removing the solvent or diluent, forming an adhesive compound which fixes the particles on the substrate, and which contains the fixing agent.

Furthermore, the present invention relates to an agent for fixing particles to a substrate, wherein the agent contains a polymerizable or polymerized organic substance.

Methods for fixing particles on a substrate play a role in microscopic observation and analysis, for example, in the field of medical engineering, biology and in ascertaining "technical cleanliness" when determining residual contamination.

When determining technical cleanliness, the surface of technical components, for example machine elements, is rinsed with a solvent, and in so doing adhering dirt particles are washed away. The washing solution is then filtered, and the particles are deposited on a filter medium. By analyzing the particles, for example by means of electron-microscopic or light-microscopic investigations, conclusions can be drawn about the quality of the manufacturing and inconsistencies in the manufacturing process of the technical component.

When determining technical cleanliness, two basic investigative approaches are of great importance. These are, on one hand, quantitative counting and measurement of particles on a filter membrane by means of optical microscopes, and on the other hand, qualitative material analysis of the particles.

The counting and measurement of the particles as a rule also supplies the qualitative distinction between metallic and non-metallic particles. For this, the investigation however requires a non-metallic background on which the particles lie during analysis. Usually, filter materials based on cellulose (cellulose nitrate) or mesh filters (made of PET or polyamide) are used as the non-metallic background.

Because of increased requirements, increasingly material analysis at least of the largest (sometimes of all) particles found is additionally required, which is frequently carried out by means of SEM/EDX (SEM—scanning electron microscope, EDX or EDS (energy dispersive X-ray spectroscopy)).

In this case, there is the problem that the substrate (for example, the filter membrane) is electrically non-conductive. Therefore, there is the risk that the particles will become charged and fly away uncontrolledly due to electrostatic effects. This occurs, in particular, with SEM/EDX analyses, since for this analysis, the particles have to be bombarded with electrons for a relatively long time and in focused manner in order to obtain sufficiently high "count rates" for the SEM/EDX spectrum.

In order to get around the disadvantage of the lack of electrical conductivity of the conventional filter membrane materials, one makes do with transferring the particles to be analyzed individually onto an electrically conductive carbon strip, so that they can be subjected to an SEM/EDX analysis without the risk of an electrostatic charge. This method cannot, however, be used for serial investigations.

It has also been proposed to fix the particles on the filter medium for electron-microscopic investigations with a fixing agent consisting of an electrically conductive material, for example by covering them over the full surface with gold or carbon. Due to this coverage, although securing of the particles on the filter medium is achieved, these are time-consuming methods which guarantee a low adhesive bond and furthermore make the material-specific investigation of the particles more difficult.

In order to avoid this disadvantage, DE 102 277 61 A1 proposes dusting the particle accumulation on the filter medium with an adhesive solution, such as for example polymers or resins, such as are used in commercially available hairsprays. After the adhesive solution has dried, organic structures which bring about cross-linking which fixes the particles on the filter form between the particles and the filter medium.

This method has the disadvantage that the adhesive at least partly covers the particles. These adhesive structures are visible on SEM micrographs and thus interfere with the evaluation. Further, good fixing of the particles can be achieved only with a relatively thick adhesive coating. A thick covering of the particles with organic material however interferes with the quality of the EDX analysis.

It is an objective of the present invention to devise a method which makes it possible to fix particles in a simple and inexpensive manner to a substrate, in particular to a filter medium, such that subsequent investigation by means of microscope or SEM/EDX is impaired as little as possible.

Furthermore, it is an objective of the present invention to make available an agent for carrying out the method, which is inexpensive, as easy as possible to handle, and non-toxic.

BRIEF SUMMARY OF THE INVENTION

These objectives are achieved by the method according to the present invention. The method according to the present invention starts from a method of the type referred to first hereinbefore. The contacting according to method step (c) takes place from the lower side of the substrate through the substrate pores.

Unlike the known method, contacting of the particles which are to be fixed, which lie on the upper side of the substrate, with the adhesive solution takes place "from below" through the pores of the substrate. As a result, the particles are held securely by the fixing agent "from below", without being covered by the fixing agent.

This method for fixing a particle accumulation on a substrate is suitable for electron-microscopic or light-microscopic investigations, and also for handling operations and transporting the substrate laden with particles, if it is a question of avoiding as far as possible a loss of particles or a change in the particle accumulation. Particularly advantageously, the method can however be used if the particles fixed on the substrate are then to be subjected to a material analysis, such as for example by means of SEM/EDX. For there is neither the risk that particles will fly away uncontrolledly during the investigation, nor is there any fear of notable corruption of the result of the analysis by the fixing agent.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
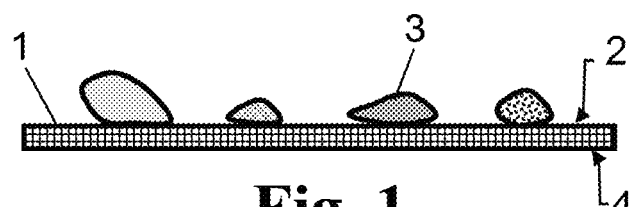
FIG. 1 shows a filter membrane with a particle accumulation which is to be analyzed.

The substrate serves as an undersurface for the particle accumulation and as a sample holder for subsequent analyses. It is formed two-dimensionally with an upper side and a lower side, the surface possibly being flat or two-dimensionally or three-dimensionally curved. The substrate contains pores, which are, for example, connected together or which extend continuously from the upper side to the lower side, so that it is permeable to gas and liquid. It consists, in particular, of conventional filter materials, such as cellulose, or a porous textile material, such as nylon or PET.

The adhesive solution contains a solvent or diluent and at least one fixing agent, for example in dissolved form, and/or at least one precursor for a fixing agent. The fixing agent is, for example, a polymeric organic substance, and the precursor is a monomeric organic substance from which a polymeric fixing agent is produced by polyreaction (polymerization, polycondensation or polyaddition).

Upon bringing the particles and adhesive solution into contact according to method step (c), the pores of the substrate fill at least partly with the dissolved fixing agent—such as, for example, a dissolved polymeric organic substance—and/or with the precursor—such as, for example a monomeric organic substance—and with the solvent or diluent, so that contact between the particles on the upper side of the substrate and the adhesive solution forms from bottom to top. The rising of the adhesive solution from the lower side of the substrate to the upper side of the substrate may be based, for example, on capillary force, which ends as soon as liquid has reached the upper side of the substrate. As a result, superposition or flooding of the particles with the fixing agent is prevented particularly effectively.

To form the adhesive compound, a drying operation is necessary in which at least part of the solvent or diluent is removed from the adhesive solution. As a result of the complete or partial removal of the solvent or diluent, an adhesive compound of greater or lesser viscosity forms in the pores of the substrate and in contact with the particles. This may be based, for example, on simple enrichment of material by drying, sedimentation and/or segregation, or by precipitation and/or by polyreaction. The viscous adhesive compound which forms contacts the particles exclusively or substantially on the contact surface thereof on the substrate, and thereby connects them to the substrate "from below".

The bringing into contact of particles and adhesive solution may for example take place by way of direct contact of the particles with the liquid adhesive solution or with constituents of the adhesive solution which form upon evaporation or vaporization thereof.

An indirect measure for bringing into contact in which the lower side of the substrate is wetted with the adhesive solution has proved particularly well suited. Due to the direct contact with the pore-containing and therefore absorbent substrate, the adhesive solution or constituents therefrom are drawn into the pores of the substrate as a result of capillary force, and thus pass rapidly to the upper side of the substrate. Checking whether an open-pored, absorbent substrate is present may be done using a dye penetration test.

The use may, for example, take place in that the adhesive solution is applied to or sprayed onto the lower side of the substrate, or in that the adhesive solution flows against the lower side of the substrate. In a particularly simple method, the wetting takes place in that an initial amount of the liquid adhesive solution is brought into contact with the lower side of the substrate in a container or on a support. In this case, the substrate with the particles which are to be fixed is laid, for example, on the initial amount of the liquid adhesive solution.

Due to the vaporization/evaporation of the solvent or diluent, the fixing agent or the precursor thereof is enriched in the adhesive solution, so that the viscous adhesive compound is formed by sedimentation, segregation, precipitation and/or by polyreaction, namely in particular in the pores of the substrate. The viscous, for example polymerized, adhesive compound thereafter remains in the pores and on the lower side of the particles which are in contact with the upper side of the substrate.

In a particularly advantageous method variant, the adhesive solution contains polymethyl methacrylate (PMMA) and/or, as precursor therefor, methyl methacrylate (MMA).

Optionally, polymerized PMMA is present in the adhesive solution in completely or partly dissolved form. Suitable solvents are for example nitromethylene chloride, methylene chloride, nitroethane, ethyl formate or ethyl acetate. To form a low-viscosity adhesive solution, it is advantageous if the PMMA macromolecules present are short-chain ones (50k) and/or if additionally, a content of monomers is present in the adhesive solution.

The method is particularly simple if the adhesive solution contains the monomeric molecule as a precursor for PMMA, i.e., monomeric methyl methacrylate (MMA). Optionally, in particular, acetone is suitable as solvent or diluent. This has the advantage that acetone can be vaporized or evaporated simply and quickly without great risks for the environment and health. The boiling point of acetone is 56° C. Upon the evaporation/vaporization of acetone, constituents of the adhesive solution, in particular smaller molecules, such as for example short-chain monomers, such as MMA, can also be transported through the pores to the upper side of the substrate.

The adhesive compound which forms in such a case consists completely or predominantly of polymerized PMMA, which guarantees good adhesion of the particles to the undersurface of the substrate and which owing to its transparency scarcely impairs, or does not impair at all, the optical analysis of the particle accumulation or SEM/EDX analysis.

In a further advantageous method variant, provision is made for the removal of the solvent or diluent to comprise a method step in which the substrate is two-dimensionally stretched.

The substrate in this case is moist, since it still contains solvent or diluent from the adhesive solution. To stretch it, the substrate is laid for example on a substrate holder which is suitable for gripping and tensioning the substrate all around. Preferably, a filter holder embodied as a drum tensioner is used for this. In the tensioned state, the residual solvent or diluent, such as for example acetone, evaporates/vaporizes more quickly, and a structure is formed from fixing compound, such as for example PMMA, beneath the particles which fixes them on the upper side of the substrate. The tensioning of the substrate in the still-moist state furthermore contributes to avoiding distortions and corrugation. For subsequent analyses, such as, for example, microscopic or SEM/EDX investigations, planar substrate surfaces are advantageous, in particular if the investigation equipment has a low depth of field.

In an alternative and equally preferred method variant, the substrate upon the bringing into contact according to method step (c) is two-dimensionally stretched.

In this case, the substrate is brought into contact with the adhesive solution in the already-stretched state. To stretch it, the substrate is laid for example on a substrate holder which is suitable for gripping and tensioning the substrate all around, such as by way of example and preferably a filter holder embodied as a drum tensioner. In this case too, the tensioning of the substrate contributes to avoiding distortions and corrugation of the substrate.

With regard to the agent for fixing particles on a substrate, the objectives set forth above, starting from an agent of the type referred to first hereinbefore, are achieved according to the present invention in that the agent contains a solution of polymethyl methacrylate (PMMA) and/or of a precursor therefor.

The agent for fixing comprises an adhesive solution, which in the simplest case contains a precursor for PMMA, i.e., for example monomeric methyl methacrylate (MMA). Optionally, in particular, acetone is suitable as solvent or diluent. This has the advantage that acetone can be vaporized or evaporated simply and quickly without great risks for the environment and health. The solvent or diluent also serves for setting the viscosity of the adhesive solution.

Alternatively, or additionally to this, already polymerized or partially polymerized PMMA is present in the adhesive solution in dissolved form. Suitable solvents are, for example, nitromethylene chloride, methylene chloride, nitroethane, ethyl formate or ethyl acetate.

The agent according to the invention is suitable, in particular, for fixing particles using the method according to the invention discussed above for conditioning a sample for electron-microscopic or light-microscopic investigation of particles on a substrate (filter medium, such as for example, a filter membrane) in the context of residual contamination analysis.

The adhesive compound which forms when using the fixing agent consists completely or predominantly of polymerized PMMA, which guarantees good adhesion of the particles to the substrate undersurface and which, because of its transparency, scarcely impairs or does not impair the optical analysis of the particle accumulation or SEM/EDX analysis.

The agent according to the invention is, in particular, suitable for fixing particles on an upper side of a two-dimensional substrate by means of an adhesive compound, the volume of which is limited substantially to the region of contact surfaces between the particles and the upper side of the substrate.

EXAMPLES

Method step (a) is providing a substrate which contains open pores and which has an upper side and a lower side, with the particles to be fixed on the upper side.

The components of a machine element in the context of residual contamination analysis are treated with a washing solution and the particle-containing washing solution is drawn off over a filter membrane. The particles contained in the washing solution are deposited on the upper side of the filter membrane.

In the example, a commercially available closed-mesh mesh filter having a filter diameter of 47 µm and made of PET material (polyethylene terephthalate) is used as filter membrane (JOMESA; 50 µm; trade name: PE-47L-50).

Figure 2:
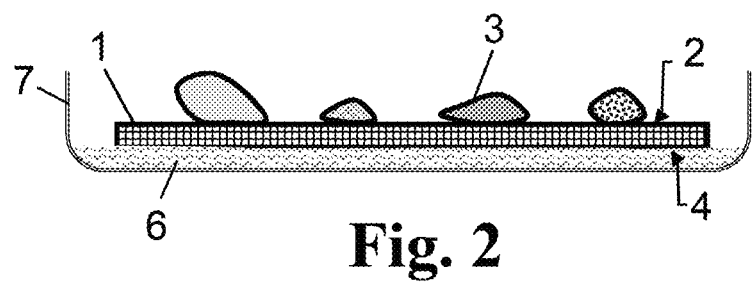
FIG. 2 shows a method step for bringing into contact the particle accumulation on the filter membrane with an adhesive solution.
Figure 3:
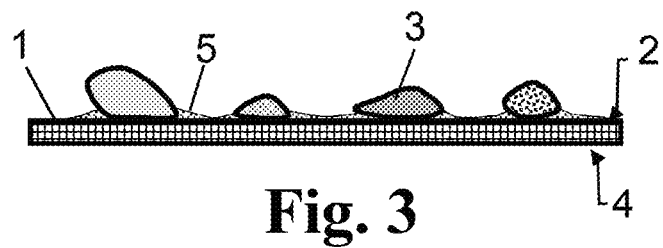
FIG. 3 shows the fixing of the particle accumulation on the filter membrane.

FIG. 1 shows schematically the filter membrane 1 and particles 3 accumulated on the upper side 2 thereof. FIG. 1 and the following schematic representations of FIGS. 2 and 3 are not to scale, but rather are for illustration purposes.

The filter membrane 1 is then prepared for analysis by means of light microscopy. This preparation comprises a preparation measure for fixing the particles 3 on the filter membrane 1. The fixing takes place in that a fixing compound 5 (FIG. 3) is produced between the particles 3 and the upper side 2 of the filter membrane 1.

Method step (b) is providing an adhesive solution which contains a fixing agent or a precursor for a fixing agent in a solvent or diluent.

The adhesive solution is composed of monomeric acrylic adhesive (methyl methacrylate; MMA), dissolved in a mixture of ethyl formate, nitroethane and butanol (obtainable from Evonik under the name Acrifix 1S 0116), diluted in acetone. A dilution in a volume ratio of 1:4 (one part acrylic adhesive, four parts acetone) supplies a sufficiently low-viscosity adhesive solution and an adhesive mass after polymerization.

Example 1 of Method Steps (c) and (d)

In one embodiment, method step (c) is bringing into contact the particles and the adhesive solution, as follows.

FIG. 2 shows schematically the procedure in which the fixing compound or a precursor therefor is applied through the filter membrane pores from the lower side 4 of the filter membrane 1.

The low-viscosity adhesive solution 6 ("fixing solution") in so doing is poured onto a glass surface or as, in the example, into a Petri dish 7, and the filter membrane 1 to be investigated is laid on the adhesive solution 6. 1 ml of the adhesive solution suffices for a filter membrane of a diameter of 47 mm.

The adhesive solution and components contained therein pass from the lower side 4 of the filter membrane 1, as a result of capillary force, through the pores to the upper side 2 and therein contact the particle surfaces which are in contact with the filter membrane 1. Due to capillary force and surface tension, the adhesive solution 6 is drawn slightly upwards on the particle surfaces.

Method step (d) is removing the solvent or diluent, and thereby forming an adhesive compound which fixes the particles on the substrate and which contains the fixing agent.

The diluent and solvent "acetone" vaporize under standard conditions (e.g., room temperature: 25° C., atmospheric pressure: 1013 hPa). In so doing, the MMA begins to polymerize, and a fixing compound 5 forms which fixes the particles 3 on the filter membrane 1, as illustrated schematically in FIG. 3.

After about 1 minute, the impregnated and still-moist filter membrane 1 is placed on a filter holder which tensions the filter membrane 1, such as for example, on a glass surface or on an adhesive paper undersurface or on a drum tensioner. In this tensioned state, the residual acetone vaporizes and a structure of polymerized MMA (PMMA) forms beneath and on the lower region of the particles which glues them to the filter membrane 1. The volume of the fixing compound is thus substantially restricted to the region of contact surfaces between the particles 3 and the upper side 2 of the filter membrane. The filter holder (such as, for example, the glass surface, the paper undersurface 9 or the drum tensioner) reduces distortion and corrugation of the filter membrane 1.

The filter membrane 1 can then be used as a sample holder for electron-microscopic and light-microscopic investigation. Even if there are relatively strong electrostatic charges, the particles do not jump away.

Example 2 of Method Steps (c) and (d)

In another embodiment, method step (c) is bringing into contact the particles and the adhesive solution, as follows.

The low-viscosity adhesive solution is poured into a Petri dish. 1 ml of the adhesive solution suffices for a filter membrane of a diameter of 47 mm. The filter membrane is placed on a filter holder which tensions the filter membrane (drum tensioner).

1 ml of the adhesive solution is poured onto the planar upper side of a support. The adhesive solution spreads over the planar upper side but does not flow away due to the surface tension, so that a thin coating (film) of adhesive solution is formed on the upper side of the support.

In the tensioned state, the filter membrane is laid with its lower side on the support which is coated with the adhesive solution.

In an alternative method variant, the filter membrane in the tensioned state is laid with its lower side on a planar upper side of the support, the upper side of the support being connected by way of an inlet channel to a storage container for the adhesive solution, via which then 1 ml of the adhesive solution is pumped onto the upper side of the support.

In this embodiment, the adhesive solution and components contained therein pass from the lower side of the filter membrane, as the result of capillary force, through the pores to the upper side and in contact with the particle surfaces which are in contact with the filter membrane.

Method step (d) is removing the solvent or diluent, and thereby forming an adhesive compound which fixes the particles on the substrate and which contains the fixing agent.

The diluent and solvent "acetone" vaporize under standard conditions (e.g., room temperature: 25° C., atmospheric pressure: 1013 hPa). In so doing, the MMA contained in the adhesive solution begins to polymerize and a fixing compound of polymerized MMA (PMMA) is formed beneath the particles, which fixing compound glues them to the filter membrane, as schematically illustrated in FIG. 3.

The filter membrane can then be used as a sample holder for electron-microscopic and light-microscopic investigation. Even in the case of relatively strong electrostatic charges, there is no loss of particles due to particles jumping away.

Example of the Agent for Fixing Particles to a Substrate

The agent consists of monomeric acrylic adhesive (methyl methacrylate; MMA), dissolved in a mixture of ethyl formate, nitroethane and butanol (obtainable from Evonik under the name Acrifix 1S 0116). This adhesive is diluted in a volume ratio of 1:4 with acetone (one part acrylic adhesive, four parts acetone), so that a low-viscosity adhesive solution is obtained.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for fixing particles on a substrate, the method comprises the steps:
   (a) providing a substrate containing open pores, the substrate having an upper side and a lower side, with the particles to be fixed on the upper side;
   (b) providing an adhesive solution containing a fixing agent and/or a precursor for the fixing agent in a solvent or diluent, the fixing agent being polymethyl methacrylate (PMMA) and the precursor being methyl methacrylate;
   (c) contacting the particles with the adhesive solution;
   (d) removing the solvent or diluent, and thereby forming an adhesive compound which fixes the particles on the substrate and which contains the fixing agent,
      wherein the contacting according to step (c) takes place from the lower side of the substrate through the open pores.

2. The method according to claim 1, wherein the lower side of the substrate is wetted with the adhesive solution.

3. The method according to claim 2, wherein the wetting takes place in that an initial amount of the adhesive solution is brought into contact with the lower side of the substrate in a container or on a support.

4. The method according to claim 1, wherein a volume of the adhesive compound is limited substantially to a region of contact surfaces between the particles and the upper side of the substrate.

5. The method according to claim 1, wherein the solvent is selected from the group consisting of nitromethylene chloride, methylene chloride, nitroethane, ethyl formate, ethyl acetate and acetone.

6. A method for fixing particles on a substrate, the method comprising the steps of:
   (a) providing a substrate containing open pores, the substrate having an upper side and a lower side, with the particles to be fixed on the upper side;
   (b) providing an adhesive solution containing a fixing agent and/or a precursor for the fixing agent in a solvent or diluent;

(c) contacting the particles with the adhesive solution; and
(d) removing the solvent or diluent, and thereby forming an adhesive compound which fixes the particles on the substrate and which contains the fixing agent,
wherein the contacting according to step (c) takes place from the lower side of the substrate through the open pores, and
wherein the removal of the solvent or diluent according to step (d) comprises two-dimensionally stretching the substrate.

7. The method according to claim 6, wherein the two-dimensional stretching takes place using a drum tensioner.

8. A method for fixing particles on a substrate, the method comprising the steps of:
(a) providing a substrate containing open pores, the substrate having an upper side and a lower side, with the particles to be fixed on the upper side;
(b) providing an adhesive solution containing a fixing agent and/or a precursor for the fixing agent in a solvent or diluent;
(c) contacting the particles with the adhesive solution; and
(d) removing the solvent or diluent, and thereby forming an adhesive compound which fixes the particles on the substrate and which contains the fixing agent,
wherein the contacting according to step (c) takes place from the lower side of the substrate through the open pores, and
wherein the contacting according to step (c) is carried out using a two-dimensionally stretched substrate.

9. The method according to claim 8, wherein a drum tensioner is used for forming the two-dimensionally stretched substrate.

* * * * *